Feb. 7, 1961 R. R. BOWEN 2,970,780
CORN SHELLING AND COB GRINDING MECHANISM
Filed Nov. 15, 1957

INVENTOR.
RALPH R. BOWEN
BY
Wheeler, Wheeler & Wheeler
ATTORNEYS

United States Patent Office 2,970,780
Patented Feb. 7, 1961

2,970,780

CORN SHELLING AND COB GRINDING MECHANISM

Ralph R. Bowen, 704 Florence St., Racine, Wis.

Filed Nov. 15, 1957, Ser. No. 696,661

4 Claims. (Cl. 241—101)

This invention relates to corn shelling and cob grinding mechanism.

It is an object of the invention to provide a device of this character on a scale for use by an individual farmer. A very high percentage of all manual labor still performed on a dairy farm and on a lesser degree, on other stock farms, is related to the handling of feed. If the farmer buys his feed in sacks, he pays a premium. If the farmer raises his own corn, he must either transport it to a mill where it can be ground or must spend his own time in the constant supervision of this operation.

Usually large batches are handled at one time and this involves a storage problem and a spoilage problem. When the corn is commercially ground, it is ordinarily handled in large quantities so that storage and spoilage problems are also encountered under those circumstances.

In many cases it is desirable to supply as one of the components of the feed, ground corn cobs as well as ground corn. Accordingly, my invention comprises a special grinder having relatively adjustable elements which may be set in such a manner that the device will either remove corn from the cob, discharging the cob and delivering solely the corn kernels or, alternatively, grind the cob into particles sufficiently small to permit delivery of the ground cob along with the shelled corn. The invention may be used alone, or in connection with feed proportioning means.

Figure 1:
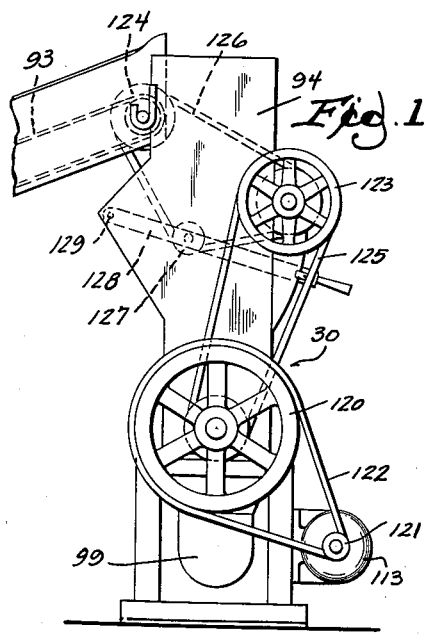
Fig. 1 is a view in front elevation of a corn shelling and cob grinding device embodying my invention.

The drawings show the combination grinder or sheller generically designated by reference character 30.

Figure 3:
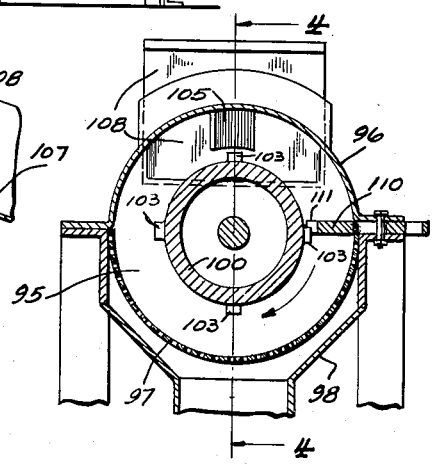
Fig. 3 is a cross-sectional view on line 3—3 of Fig. 2.

The corn on the cob may be delivered by means of conveyor 93 to a hopper 94 which opens vertically downwardly into the shelling chamber 95. This chamber comprises a semi-cylindrical top wall 96 (Fig. 3) and a semi-cylindrical foraminous screen 97 serving as its bottom wall. Below the screen is a hopper 98 from which spout 99 leads to a point of delivery which may be the pit of a pneumatic elevator. The openings in the screen 97 are sufficiently large to pass the shelled corn.

Figure 4:
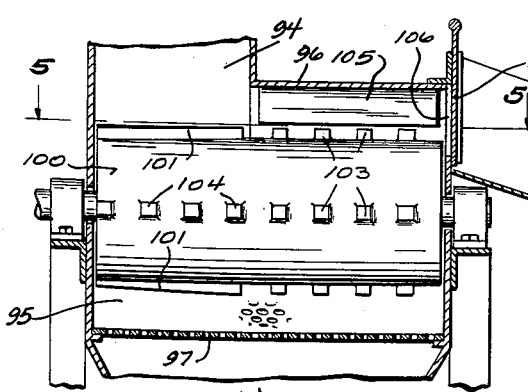
Fig. 4 is a cross-sectional view on line 4—4 of Fig. 3.
Figure 5:
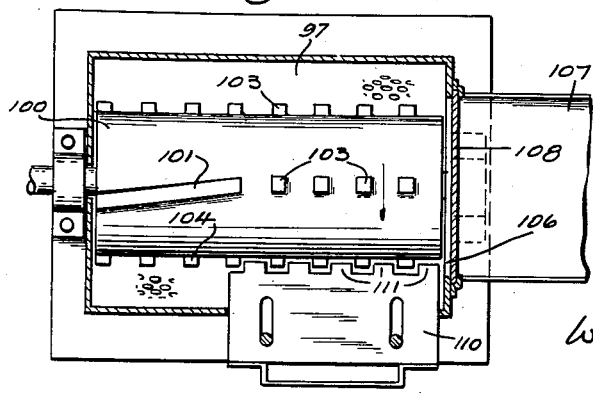
Fig. 5 is a cross-sectional view on line 5—5 of Fig. 4.

Rotatable in chamber 95 is a cylinder 100 provided for a part of its length with feeding ribs 101 inclined with reference to the cylinder axis and located at diametrically opposite points. Beyond these ribs the cylinder is provided with a row of square-cut shelling projections or protuberances 103. A row of similar projections 104 intervene between the feeding ribs or flanges 101. The cylinder causes the ears of corn to move about within the chamber 95 until the abrasion of the ears upon each other and upon the screen 97 displaces the kernels, which thereupon pass through the screen and are discharged. The cobs ultimately tend to be lifted by the projections 103 into engagement with the angularly set baffle 105 carried by the top wall 96 above the cylinder. This baffle deflects the cobs through a port 106 onto the discharge chute 107 unless a gate at 108 is lowered to the position shown in Figs. 3 and 4. If the gate is down, egress of the cobs is precluded. If a plate 110, laterally adjustable through the side of the chamber 95, is pushed inwardly as shown in Fig. 5, its edge, which is relieved to have a castellated profile functions like the concave of a feed cutter to cooperate with the teeth 103 of the cylinder 100 for the disintegration of the cobs. The disintegrating action continues until the pieces are sufficiently small to pass through the openings of the screen 97 along with the kernels of corn.

Accordingly, with the gate 108 up and the slide 110 retracted, the device operates to shell the corn and discharge the cobs. With the gate lowered and the slide advanced as shown, the teeth 111 of the slide intermesh with the teeth 103 of the cylinder 100 to disintegrate the cobs and to make a feed which is a composite of the cob particles and the shelled corn. In that event, both the corn and the fragments of the cobs pass out together through the screen.

Figure 2:
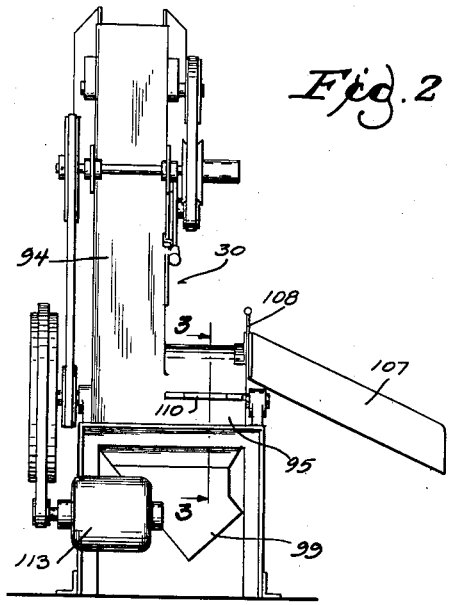
Fig. 2 is a view in side elevation of the device of Fig. 1.

The combination corn sheller and cob disintegrator device may be driven from any suitable power source, such as motor 113 in Figs. 1 and 2. Any suitable drive train, such as pulleys 120 and 121 and belt 122 may be used to transmit the power to the drum 100. Further pulleys 123 and 124, with belts 125 and 126 may be used if desired to power conveyer 93, and clutch lever 128 pivoted at 129 and bearing an idler roller 127, may be provided to control the loading of hopper 94.

I claim:

1. A corn shelling and cob grinding device comprising a rotatable cylinder, protuberances spaced about the periphery of said cylinder, a fixed housing surrounding said cylinder, an intake port in said housing adjacent one end of said cylinder, said housing being provided with a foraminous lower portion, a plate having an edge profile relieved to accommodate the profile of the protuberances on said cylinder, means mounting said plate for movement toward and away from the vicinity of the periphery of said cylinder, a helical baffle extending longitudinally at the upper portion of said housing and above said cylinder, and a movable gate in said housing adjacent said baffle.

2. The device of claim 1 in which said cylinder is further provided with helically pitched ribs, said ribs being adapted to propel a substance to be ground toward said protuberances, said protuberances being approximately cubical and arranged in peripherally spaced generally axial rows, said movable plate having a castellated edge and being movable substantially in a plane including the axis of rotation of said cylinder, said ribs being adjacent the intake end of said cylinder, and said plate being adjacent the other end of said cylinder.

3. A corn shelling and cob grinding device comprising a rotor, axially extending means on said rotor for feeding material axially of said rotor, shelling and grinding means on said rotor, a housing generally concentric with said rotor, means on said housing having a profile complementary to said shelling and grinding means on said rotor, a mounting supporting said means for movement in a direction toward and from said shelling and grinding means, said housing being provided with a foraminous lower portion having small openings and an upper discharge opening which is relatively large, said housing being further provided with means to close said upper opening.

4. A grinding device comprising a housing, a hopper opening into one end of said housing, a rotor, grinding means spaced axially and peripherally on said rotor, means for feeding material axially of said rotor away from said hopper, said housing being provided with an upper discharge port above the end of said rotor and remote from said hopper, said housing being further provided with a plurality of small discharge openings below said rotor, and means movable to cooperate with said rotor to prevent large particles from reaching said upper port.

References Cited in the file of this patent

UNITED STATES PATENTS

| | | |
|---|---|---|
| 26,010 | Burr | Nov. 8, 1859 |
| 843,428 | Ancel | Feb. 5, 1907 |
| 1,137,100 | Watts | Apr. 27, 1915 |
| 1,739,574 | Bohmker | Dec. 17, 1929 |
| 2,271,897 | Mast | Feb. 3, 1942 |
| 2,271,898 | Mast | Feb. 3, 1942 |
| 2,291,113 | Sponseller | July 28, 1942 |
| 2,869,793 | Montgomery | Jan. 20, 1959 |